United States Patent [19]

Senet et al.

[11] 4,241,202
[45] Dec. 23, 1980

[54] ALLYL-ACRYLIC MONOMERS, THEIR PREPARATION AND POLYMERS DERIVED THEREFROM

[75] Inventors: Jean-Pierre G. Senet, Melun; Patrice M. Le Roy, Ballancourt sur Essonne, both of France

[73] Assignee: Societe Nationale des Poudres et Explosifs, Paris Cedex, France

[21] Appl. No.: 974,028

[22] Filed: Dec. 28, 1978

Related U.S. Application Data

[62] Division of Ser. No. 829,474, Aug. 31, 1977, Pat. No. 4,199,526.

[30] Foreign Application Priority Data

Sep. 7, 1976 [FR] France .................... 76 26913

[51] Int. Cl.$^3$ .................... C08F 120/26; C08F 120/36
[52] U.S. Cl. .................... 526/73; 526/301
[58] Field of Search .................... 526/312, 73, 301

[56] References Cited

U.S. PATENT DOCUMENTS

| | | | |
|---|---|---|---|
| 2,568,608 | 9/1951 | Brailey | 526/301 |
| 3,953,544 | 4/1976 | Jones et al. | 526/312 |

*Primary Examiner*—Harry Wong, Jr.
*Attorney, Agent, or Firm*—Bucknam and Archer

[57] ABSTRACT

Novel allyl-acrylic monomers of the formula:

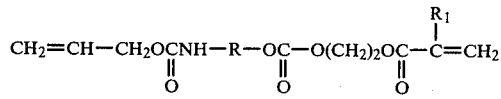

wherein R is a $C_{1-4}$ alkylene group and $R_1$ is hydrogen or methyl, are described. The preferred monomer is that in which R is ethylene and $R_1$ is methyl. When subjected to conventional free radical polymerization, in one stage or two stages, these monomers give transparent polymers having good mechanical properties, particularly hardness.

5 Claims, No Drawings

ALLYL-ACRYLIC MONOMERS, THEIR PREPARATION AND POLYMERS DERIVED THEREFROM

This is a division, of application Ser. No. 829,474, filed Aug. 31, 1977, now U.S. Pat. No. 4,199,526.

The present invention is concerned with novel monomers which contain both an allyl group and a methacrylyl or acrylyl group (hereinafter "allyl-acrylic monomers") with processes for their preparation, and with polymers derived therefrom.

As indicated by C. E. Schildknecht ("Allyl compounds and their polymers" *High polymers,* vol. 28, p, 618, Wiley-Interscience, 1973), the polymerisation of allyl-acrylic monomers can be carried out in two stages, the first leading to soluble and mouldable products (acrylic polymerisation) and the second to cross-linked products (allyl polymerisation).

The best known representative of this class of monomers is ethylene glycol allyl carbonate methacrylate:

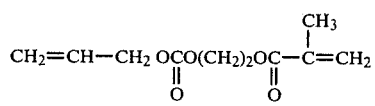

which is described in U.S. Pat. Nos. 2,384,115, 2,384,124 and 2,399,285.

Unsaturated monomers containing carbamate and carbonate groups are of great interest in the manufacture of transparent materials. For example, Allymer C. R. 149 (a trade mark of Pittsburgh Plate Glass Company) described in U.S. Pat. No. 2,397,631 and having the following structure:

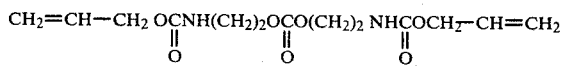

can be polymerised to form organic "glasses" which have good properties in respect of hardness, flexural strength and abrasion.

We have now found a novel class of allyl-acrylic monomers which, when polymerised, give transparent polymers having better mechanical properties than those of the polymers obtained from the monomers specified above.

According to the present invention, there are provided allyl-acrylic monomers of the formula:

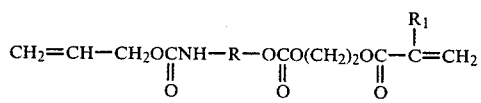

in which R is an alkylene group having 1 to 4 carbon atoms and $R_1$ is a hydrogen atom or a methyl group.

In this formula, an allyl group is seen at the left hand end, an acrylyl group ($R_1=H$) or methacrylyl group ($R_1=CH_3$) at the right hand end, and, to the right of the allyl group, a carbamate group

The preferred monomer according to the invention is the compound of the formula

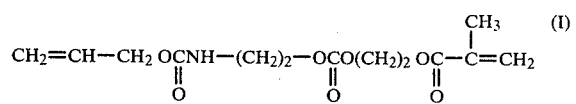

This compound (I) is a colourless oil which can be readily identified by intra-red spectrophotometry and nuclear magnetic resonance Compound I has a density of about 1.35 and a hardness greater than 40 points on the Barcol scale.

The present invention also comprises a process for the preparation of a monomer according to the invention, which process comprises condensing an allyl chloroformate of the formula:

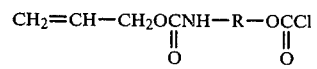

in which R has the above-stated meaning, with the compound of the formula:

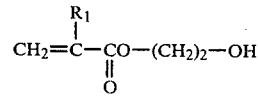

in which $R_1$ has the above-stated meaning.

The condensation is preferably carried out in the presence of pyridine and methylene chloride.

To prepare the preferred compound according to the invention, the chloroformate of the formula:

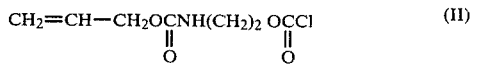

is condensed with 2-hydroxyethyl methacrylate of the formula:

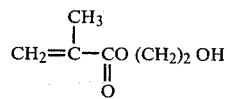

The chloroformate (II) can be prepared by a method described in U.S. Pat. No. 2,397,631, in accordance with the following reactions (a) and (b):

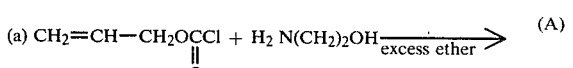

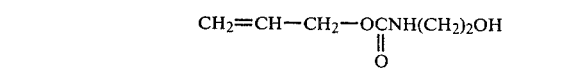

The condensation reaction leading to the preferred monomer of the invention may be written:

$$(c) \; (II) + CH_2=\underset{\underset{O}{\|}}{\overset{\overset{CH_3}{|}}{C}}-CO(CH_2)_2OH \xrightarrow[CH_2Cl_2]{pyridine} (I)$$

In order that the invention may be more fully understood, the following example of the preparation of a monomer is given by way of illustration only:

EXAMPLE 1

(a) Condensation of allyl chloroformate with monoethanolamine 73.2 g (1.2 mols) of monoethanolamine and 200 ml of anhydrous diethyl ether were introduced into a reactor equipped with a stirrer, a thermometer, a dip tube and a dropping funnel. The mixture was cooled to 0° C. and 60.25 g (0.5 mol) of allyl chloroformate were added slowly, whilst stirring. The temperature of the reaction mixture was kept below +5° C.; the time required to complete the addition was 2 hours.

The mixture was stirred for 1 hour and then treated with a stream of anhydrous hydrogen chloride until absorption of the latter ceased.

The monoethanolamine hydrochloride obtained was removed by filtration and the solvent was removed by evaporation under reduced pressure.

53 g (yield 75% relative to the allyl chloroformate) of a yellow oil (compound A) were thus obtained.

Analysis: NMR spectrum (solvent CDCl$_3$, reference product: tetramethylsilane)

$$CH_2=CH-CH_2-O\underset{\underset{O}{\|}}{C}NH-CH_2-CH_2\,OH$$
$$(d) \quad (f) \quad (c) \qquad (a) \quad (b) \quad (e)$$

(a) triplet centred at 3.26 ppm
(b) triplet centred at 3.64 ppm
(c) doublet of which each peak is doubled, centred at 4.51 ppm
(d) and (f) characteristic hump
(e) singlet exchangeable in D$_2$O at 5.24 ppm
OH content: 6.3 equivalents/kg (b) Phosgenation of compound A:

50 g of liquid phosgene were introduced into a reactor equipped with a condenser operated at −40° C., a stirrer, a dropping funnel and a thermometer. 43.5 g (0.3 mol) of the compound A obtained above were then slowly added whilst stirring. The temperature of the reaction mixture was maintained at between −15° and −10° C. during the period of addition.

The chloroformate was freed from the excess phosgene and from the dissolved hydrochloric acid by bubbling nitrogen through the mixture, whilst stirring.

52 g (yield 84%) of a slightly yellow oil (compound II) were collected. The infra-red spectrum agrees with the assumed structure of the product. The measured chlorine content is 16.7% (theory: 17.1%).

(c) Condensation of the chloroformate (II) with 2-hydroxyethyl methacrylate 26 g (0.2 mol) of 2-hydroxyethyl methacrylate stabilised with 100 ppm of hydroquinone, 18.9 g (0.24 mol) of pyridine and 60 ml of anhydrous methylene chloride were introduced into a reactor equipped as described in b).

The mixture was cooled to +5° C. and 41.5 g (0.2 mol) of compound II were added over a period of about 2 hours, whilst stirring and keeping the temperature at between +5° and +10° C.

The mixture was stirred for 1 hour at +5° C. and 100 ml of distilled water were added.

The organic phase was decanted and washed with 100 ml of 2 N hydrochloric acid and then with pure water until the wash waters were neutral.

After drying over anhydrous sodium sulphate and evaporating the solvent under reduced pressure (temperature not more than 30° C.) 55 g of a colourless oil, representing a yield of 91%, and consisting of the preferred monomer according to the invention, compound (I), were collected.

Characteristics of the monomer obtained:

$$\begin{array}{c}
(f) \quad (h) \quad (e) \qquad\qquad (b)\ (c) \\
CH_2=CH-CH_2-O-\underset{\underset{O}{\|}}{C}\,NH\,CH_2\,CH_2-O \\
\qquad\qquad\qquad\qquad\qquad\qquad\qquad\qquad\diagdown \\
\qquad\qquad\qquad\qquad\qquad\qquad\qquad\qquad\qquad C=O \\
(i)H \qquad\qquad\qquad\qquad\qquad\qquad\qquad\diagup \\
\quad\diagdown C=C-\underset{\underset{O}{\|}}{C}-O-CH_2\,CH_2-O \\
\diagup \quad\quad | \\
(g)H \quad CH_3 \qquad (d)\ (d) \\
(a)
\end{array}$$

NMR spectrum (solvent: CDCl$_3$, reference product: tetramethylsilane)

(a) multiplet at 1.93 ppm
(b) triplet at 3.5 ppm
(c) triplet at 4.22 ppm
(d) singlet at 4.6 ppm
(e) doublet, of which each peak is doubled, centred at 4.56 ppm
(f) hump
(g) hump centred at 5.6 ppm
(h) very broad hump partly masked by II(g) and II(i)
(i) hump at 6.15 ppm
IR spectrum (solvent, CCl$_4$)
C=O carbonate band: 1,755 cm$^{-1}$
C=O carbamate and ester band: 1,725 cm$^{-1}$ (broad band).

The present invention also comprises the polymers obtained by the polymerisation of an allyl-acrylic monomer according to the invention.

This polymerisation is preferably carried out in two stages, so as successively to cause the polymerisation of the acrylyl or methacrylyl groups and then the polymerisation of the allyl groups.

The product obtained in a first stage is a perfectly thermoplastic linear polymer resulting from the opening of the acrylic or methacrylic double bonds.

In the second stage, this linear polymer is converted to a polymer having a three-dimensional structure resulting from the opening of the allyl double bonds.

In practice, the first stage is preferably carried out in the presence of a solvent such as dimethylformamide, ethyl acetate, chloroform, a ketone or aromatic solvent and of a small amount of a free radical initiator. Suitable concentrations of the monomer in the solvent depend, inter alia, on the nature of the solvent; suitable concentrations are, for example, from 10 and 50%.

In principle, any free radical initiator can be used, for example, isopropyl percarbonate, lauryl peroxide, benzoyl peroxide, diamyl peroxide, t-butyl hydroperoxide, methyl ethyl ketone peroxide, di-t-butyl peroxide, cumene hydroperoxide, azobisisobutyronitrile, or cyclohexyl percarbonate.

Suitable polymerisation conditions (proportion of initiator, temperature and duration) depend, of course, on the nature of the initiator, the concentration of the monomer in the solvent and the degree of conversion desired at the end of the first stage. It is, in fact, possible to obtain a whole range of products with different characteristics by varying the molecular weight of the linear polymer obtained during the first stage.

For example, one suitable combination of conditions is the use of cyclohexyl percarbonate as the initiator in a proportion of from 0.2 and 0.65% relative to the monomer at a temperature of 35° C. and a polymerisation period of 2 to 24 hours. With the same initiator, a proportion of from 0.1 and 0.40% relative to the monomer can be used at a temperature of 55° C. for a polymerisation period of 2 to 24 hours. It is of course possible to use lower or higher proportions by increasing or reducing the polymerisation times or temperatures.

At the end of the first stage, the polymer is precipitated by the addition of a non-solvent, and the product is filtered off and dried. If the polymerisation conditions have been correctly chosen, the product is a thermoplastic white powder. This polymer contains all the allyl unsaturation and some unreacted acrylic unsaturation.

The initiator required for the polymerisation of these unsaturated structures is then added and mixed with the dry polymer, which is then subjected to a heat cycle. Any free radical initiator can, in principle, be used for the second stage; however it is preferable to choose initiators having a high decomposition temperature so as to achieve conversion conditions which are compatible with injection moulding (for example, 1,3-bis-tertiary butyl-peroxyisopropyl-benzene).

The polymerisation conditions in this second stage essentially depend on the following parameters: nature and proportion of initiator, temperature and duration.

By way of indication, the following conditions are, for example suitable: proportion of 1,3-bis-tertiary butyl-peroxyisopropyl-benzene, 2%; temperature, 160° C.; duration, 4 minutes.

At the end of this cycle, it is desirable to reheat the material for 1 hour at 110° C. The duration of the cross-linking reaction can be considerably reduced by using a rising temperature cycle.

Mouldings can also be produced by casting the allyl-acrylic monomers using a single-stage process.

For this purpose, the monomer is catalysed with a free radical promotor (similar to those described above) and is then cast in a mould. The whole is then placed in an oven or a water bath. Once the polymerisation cycle has been completed, the material is released from the mould and then reheated. Suitable polymerisation conditions for this type of process are, for example, as follows:

for the polymerisation: proportion of cyclohexyl percarbonate, 0.5 to 4%; temperature, 35° to 55° C.; duration, 6 to 24 hours;

for the reheating: temperature, 90° to 110° C.; duration, 30 minutes to 2 hours.

In order that the invention may be more fully understood, the following examples of polymerisation processes are given by way of illustration:

EXAMPLE 2

1st stage: 135 g of compound (I) were mixed with 765 g of chloroform. The mixture was heated to 50° C. and 0.1844 g of benzoyl peroxide was then dissolved in the mixture. The polymerisation was carried out in a reactor under a stream of nitrogen and whilst maintaining good stirring of the solution. After 10 hours, the polymer was precipitated in ethanol and then filtered off and dried. The degree of conversion of the monomer to polymer was 30%.

The characteristics of the polymer obtained were as follows:
molecular weight: 150,000
polydispersity: 3
glass transition temperature: −23° C.
moulding conditions: temperature 180° C., pressure 100 bars time: 5 minutes
good transparency.

2nd stage: 2% of 1,3-bis-(teritary butyl-peroxyisopropyl)-benzene were added to the polymer obtained from the 1st stage. The product was then moulded in a press at 170° C. for 5 minutes after which it was reheated for 2 hours at 110° C.

The sheet thus obtained was transparent; its hardness was 44 points on the Barcol scale and its density was 1.354.

EXAMPLE 3

1st stage: 150 g of compound (I) were mixed with 750 g of chloroform; the mixture was heated, to 50° C. and 0.1844 g of benzoyl peroxide were dissolved in the mixture. After 24 hours polymerisation, 75g of polymer were precipitated in ethanol (representing a degree of conversion of 50%).

The molecular weight of the polymer obtained was very high (above 500,000).

The glass transition temperature was −21° C.

2nd stage: after adding 2% of 1,3-bis-(tertiary butyl-peroxyisopropyl)-benzene to the polymer from the 1st stage, the product was moulded at 180° C. for 5 minutes. Reheating for 2 hours at 110° C. completed the polymerisation and gave a transparent, hard (45 points on the Barcol scale) product (density 1.350).

EXAMPLE 4

0.5 g of cyclohexyl percarbonate was dissolved in 100 g of compound (I). This solution was then poured into a mould consisting of two glass plates separated by a plastic gasket having a thickness of 3 mm. The mould was then immersed in a water bath and subjected to the following heat cycle:
48 hours at 40° C.
1 hour at 50° C.
1 hour at 60° C.
1 hour 30 minutes at 80° C.
2 hours at 90° C.
3 hours at 115° C.

After release from the mould, the material obtained from the following characteristics:
good transparency
hardness: 44 points on the Barcol scale
density: 1.354
tensile strength: 3.30 hbar
Young's modulus: 121 hbar

EXAMPLE 5

1 g of cyclohexyl percarbonate was mixed with 100 g of compound (I). This solution was then poured into a mould consisting of two glass plates separated by a plastic gasket having a thickness of 3 mm. The mould was then immersed in a water bath and subjected to the following heat cycle:

15 hours at 40° C.
1 hour at 50° C.
1 hour at 60° C.
1 hour 30 minutes at 80° C.
2 hours at 90° C.
3 hours at 115° C.

After release from the mould, the material obtained had the following characteristics:

good transparency
hardness: 54 points on the Barcol scale
density: 1.351.

It will be apparent from the foregoing examples that the monomers according to the invention can be polymerised to form transparent polymers having valuable mechanical properties, in particular a remarkable hardness. It is believed that these properties are largely due to the presence of a carbamate group between the allyl and methacrylyl or acrylyl groups of the monomers according to the invention.

These mechanical properties of the polymers obtained from the monomers according to the invention make these polymers applicable to the production of a wide variety of transparent products capable of resisting impact, particularly from particles of dust or sand. Thus, the polymers according to the invention can be used in the production of transparent panels, windscreens or rear windows of cars, transparent shelters and the like.

What is claimed is:

1. A polymer obtained by polymerising an allyl-acrylic monomer of the formula:

$$CH_2=CH-CH_2OCNH-R-OCO(CH_2)_2OC-\underset{|}{\overset{R_1}{C}}=CH_2$$
$$\phantom{CH_2=CH-CH_2O}\underset{O}{\|}\phantom{NH-R-O}\underset{O}{\|}\phantom{O(CH_2)_2O}\underset{O}{\|}$$

wherein R is an alkylene group having 1 to 4 carbon atoms and $R_1$ is selected from the group consisting of a hydrogen atom and a methyl group, wherein both the allyl $CH_2=CH-CH_2$ group and the acrylyl or methacrylyl group

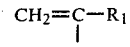

in said monomer have been polymerized and wherein polymerization occurs in a first stage at said acrylic or methacrylic group

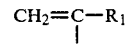

to form a linear polymer and polymerization at the allylic group occurs in a second stage to form a three dimensional polymer.

2. A polymer according to claim 1, wherein R is $-CH_2-CH_2-$ and $R_1$ is methyl.

3. A polymer according to claim 2, which has a density of about 1.35 and a hardness greater than 40 points on the Barcol scale.

4. The polymer according to claim 1 wherein polymerization in said first stage is carried out in the presence of a solvent with a free radical initiator and polymerization in the second stage is carried out with an initiator having a high decomposition temperature.

5. A polymer obtained by polymerising an allyl-acrylic monomer of the formula:

$$CH_2=CH-CH_2OCNH-R-OCO(CH_2)_2OC-\underset{|}{\overset{R_1}{C}}=CH_2$$
$$\phantom{CH_2=CH-CH_2O}\underset{O}{\|}\phantom{NH-R-O}\underset{O}{\|}\phantom{O(CH_2)_2O}\underset{O}{\|}$$

wherein R is an alkylene group having 1 to 4 carbon atoms and $R_1$ is selected from the group consisting of a hydrogen atom and a methyl group wherein both the allyl $CH_2=CH-CH_2$ group and the acrylyl or methacrylyl group

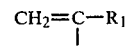

in said monomer have been polymerized, polymerization occurs at said acrylic or methacrylic group

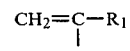

to form a linear polymer and polymerization at the allylic group occurs to form a three dimensional polymer, and wherein polymerization both at the allylic and the acrylic or methacrylic group occurs in the same stage.

* * * * *